(12) United States Patent
Grella

(10) Patent No.: US 11,124,051 B2
(45) Date of Patent: Sep. 21, 2021

(54) HYBRID DOOR MODULE

(71) Applicant: MAGNA CLOSURES INC., Newmarket (CA)

(72) Inventor: Philip Grella, Toronto (CA)

(73) Assignee: MAGNA CLOSURES INC., Newmarket (CA)

( * ) Notice: Subject to any disclaimer, the term of this patent is extended or adjusted under 35 U.S.C. 154(b) by 170 days.

(21) Appl. No.: 16/446,049

(22) Filed: Jun. 19, 2019

(65) Prior Publication Data

US 2020/0001691 A1 Jan. 2, 2020

Related U.S. Application Data

(60) Provisional application No. 62/691,978, filed on Jun. 29, 2018.

(51) Int. Cl.
*B60J 5/04* (2006.01)

(52) U.S. Cl.
CPC .............. *B60J 5/0455* (2013.01); *B60J 5/045* (2013.01); *B60J 5/0413* (2013.01); *B60J 5/0415* (2013.01); *B60J 5/0463* (2013.01)

(58) Field of Classification Search
CPC ........ B60J 5/0455; B60J 5/045; B60J 5/0463; B60J 5/0415; B60J 5/0413
See application file for complete search history.

(56) References Cited

U.S. PATENT DOCUMENTS

| | | | |
|---|---|---|---|
| 5,857,732 A | 1/1999 | Ritchie | |
| 6,056,349 A * | 5/2000 | Seksaria | ................. B60J 5/045 296/146.5 |
| 6,135,537 A | 10/2000 | Giddons | |
| 6,205,714 B1 | 3/2001 | Staser et al. | |
| 6,328,359 B1 | 12/2001 | Pacella et al. | |
| 7,490,438 B1 | 2/2009 | Maass et al. | |
| 7,607,716 B2 | 10/2009 | Buchta et al. | |
| 8,136,866 B2 | 3/2012 | Broadhead | |
| 10,723,206 B2 | 7/2020 | Fischer et al. | |
| 2010/0052360 A1 * | 3/2010 | Hsu | ................. B60J 5/044 296/146.6 |
| 2014/0125087 A1 | 5/2014 | Kalliomaki et al. | |
| 2019/0039538 A1 | 2/2019 | Grgac et al. | |

FOREIGN PATENT DOCUMENTS

| | | |
|---|---|---|
| WO | 2005035287 A1 | 4/2005 |
| WO | 2012056137 A1 | 5/2012 |
| WO | 2014139790 A1 | 9/2014 |
| WO | 2018106989 A1 | 6/2018 |

* cited by examiner

*Primary Examiner* — D Glenn Dayoan
*Assistant Examiner* — Melissa Ann Bonifazi
(74) *Attorney, Agent, or Firm* — Dickinson Wright PLLC

(57) ABSTRACT

A carrier module for a motor vehicle door assembly having inner and outer panels defining a door panel structure with the inner panel having an opening for selective access to an internal door cavity between the inner and outer panels is provided. The carrier including an outer periphery configured for attachment to the inner panel to substantially close off the opening, and at least one reinforcement member fixed to the carrier, the at least one reinforcement member being formed of a material having a resistance to loading that is greater than a resistance to loading of a material of the carrier.

19 Claims, 14 Drawing Sheets

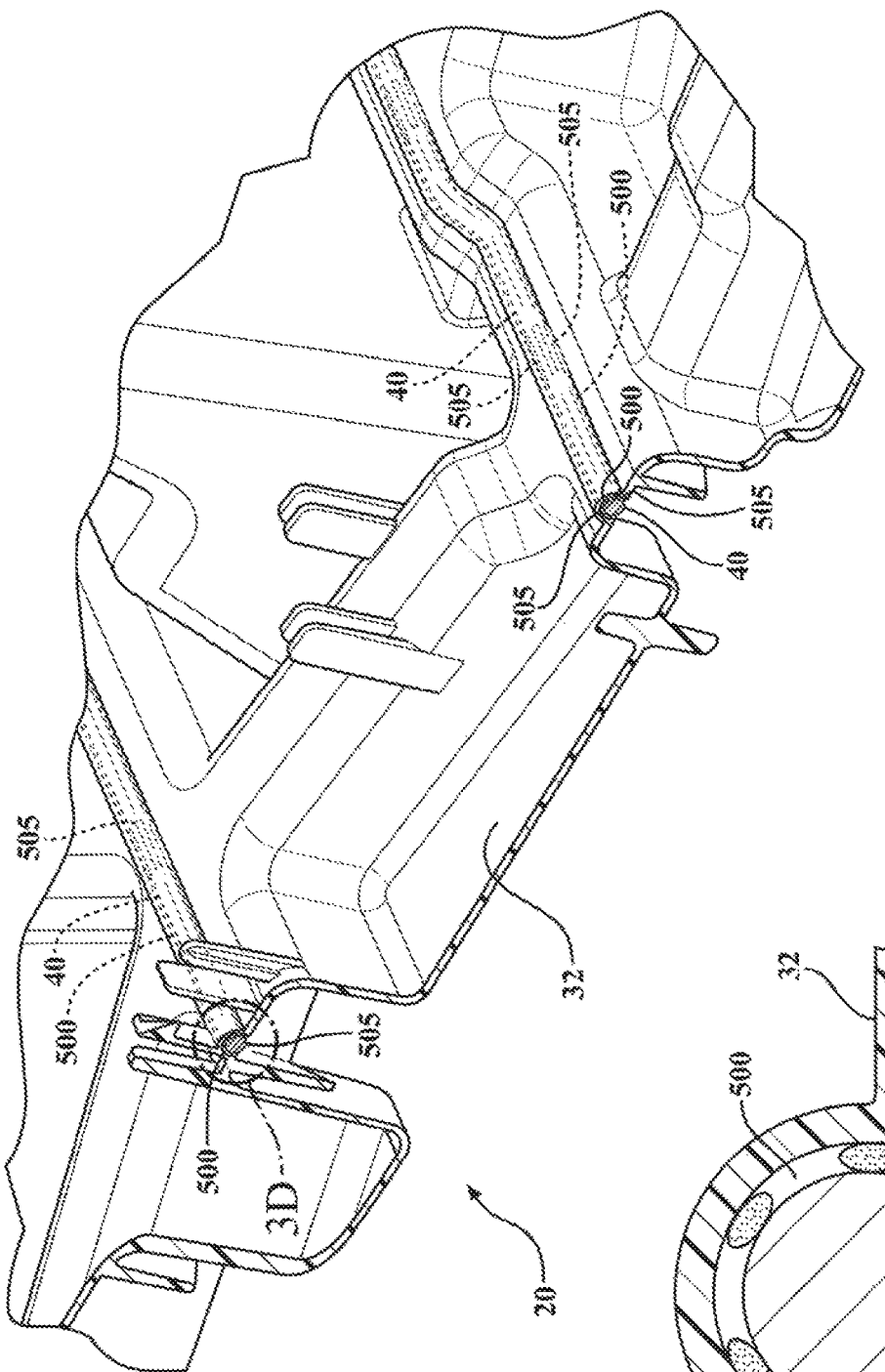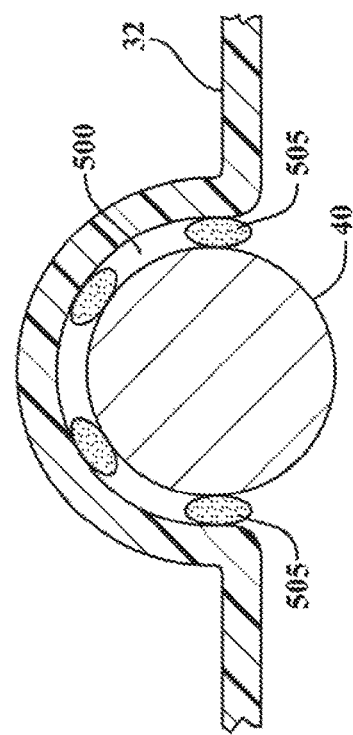
FIG. 3C
FIG. 3D

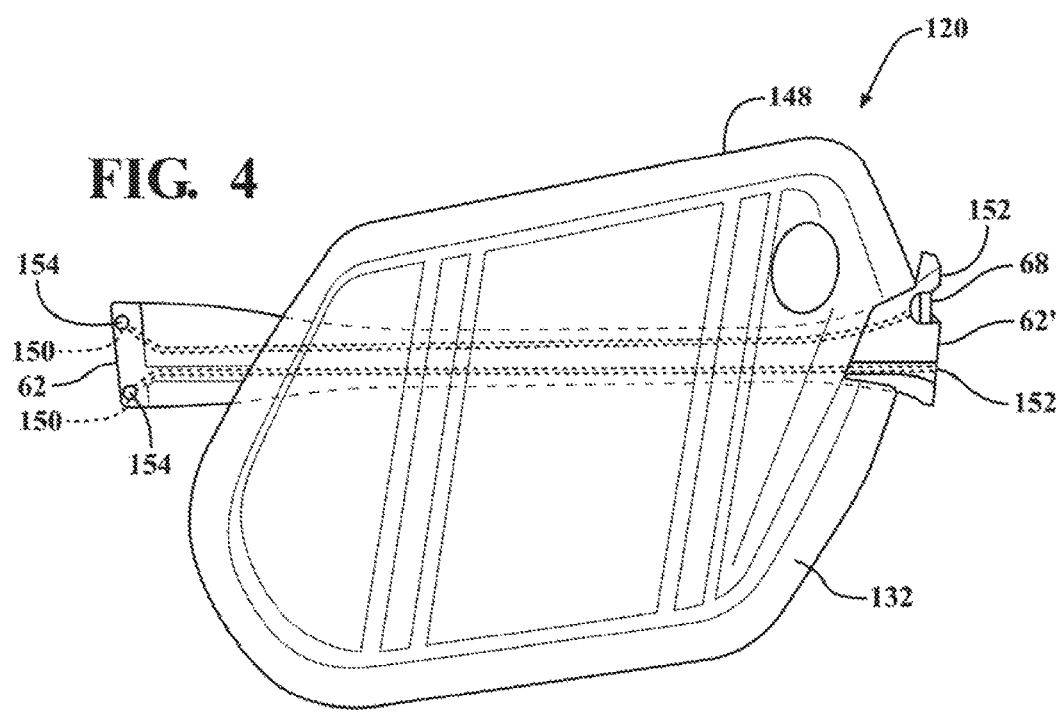
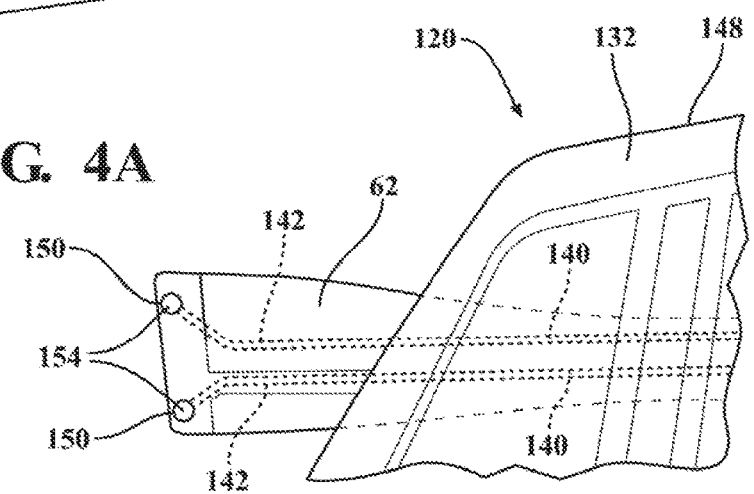
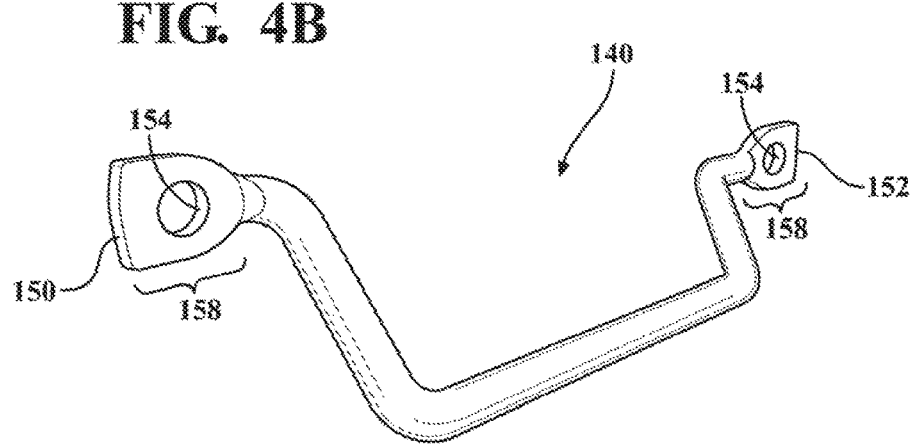

FIG. 5B
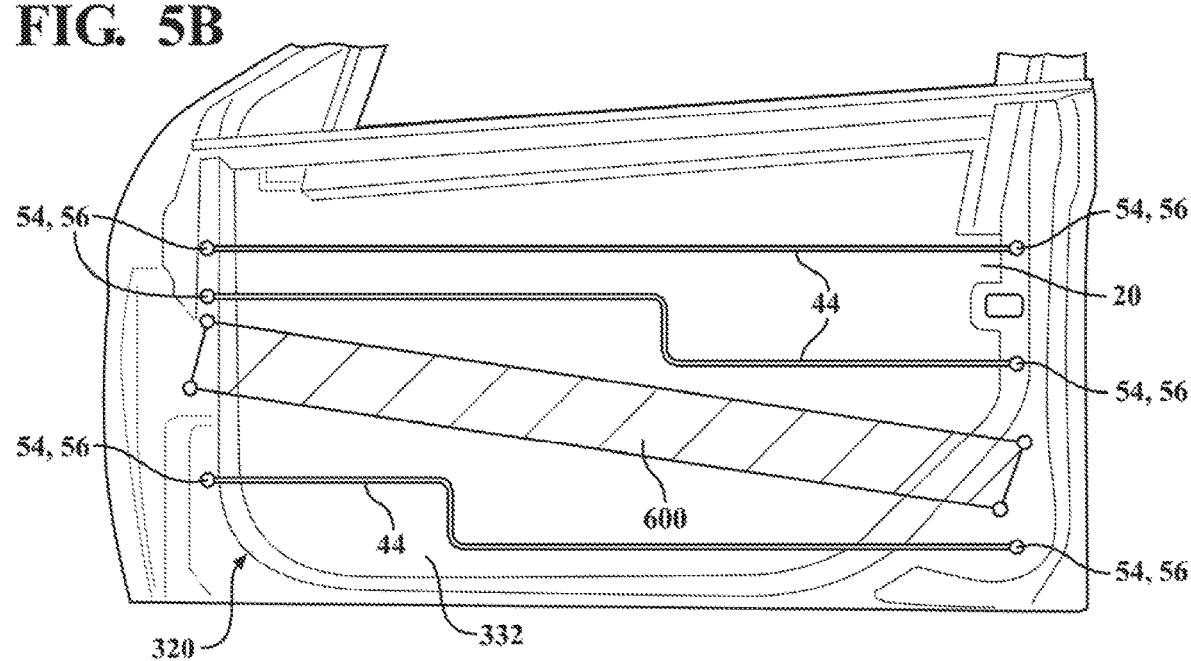
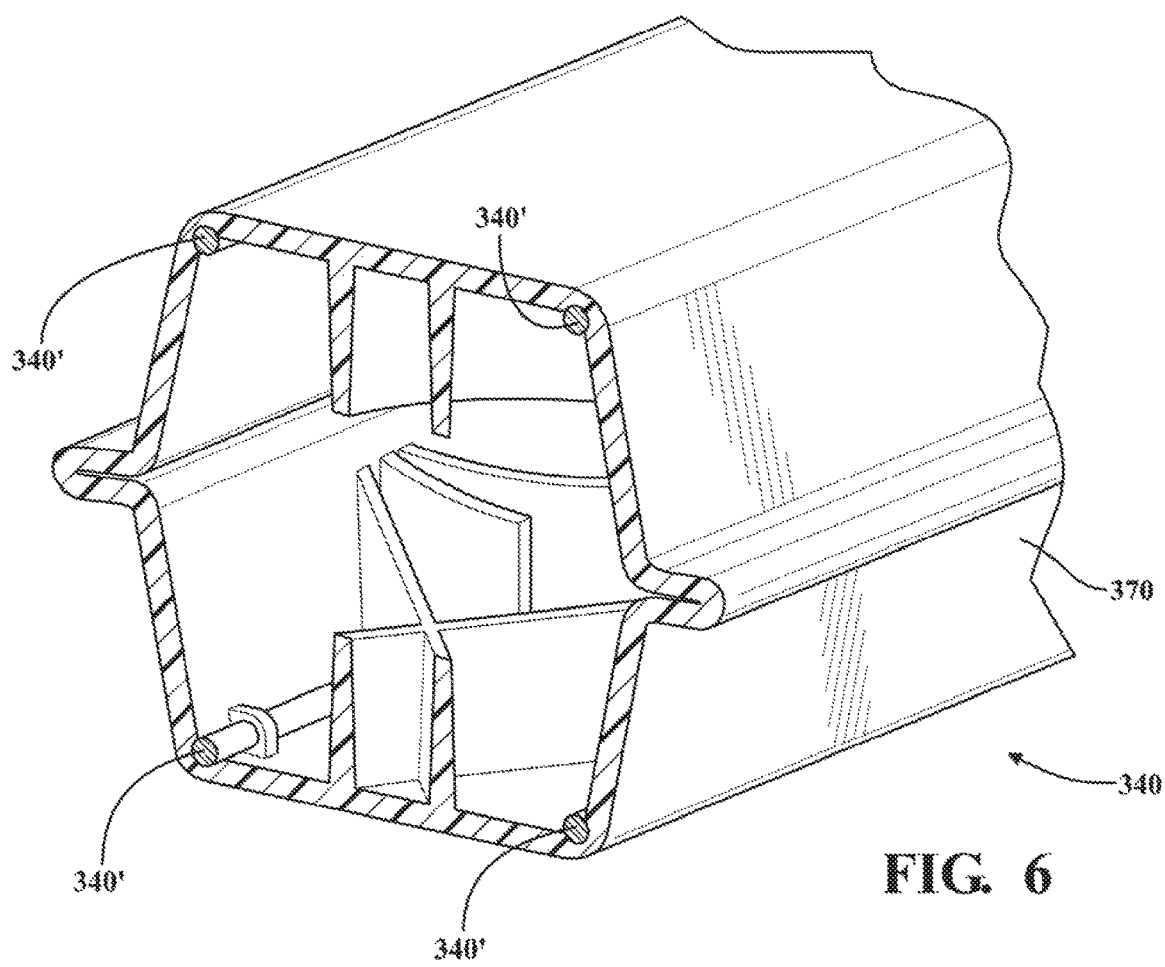
FIG. 6

HYBRID DOOR MODULE

CROSS-REFERENCE TO RELATED APPLICATION

This application claims the benefit of U.S. Provisional Application Ser. No. 62/691,978, filed Jun. 29, 2018, which is incorporated herein by way of reference in its entirety.

FIELD

The present disclosure relates generally to vehicle door assemblies, and more particularly to carrier modules therefor.

BACKGROUND

This section provides background information related to the present disclosure which is not necessarily prior art.

The automotive industry continuously seeks to better protect occupants of vehicles during crash conditions. In particular, attention is continually being paid to preventing occupant injury during side impacts, since there is relatively little structure in vehicle panels and doors that is available to protect vehicle occupants, as compared to the safety structure present during front-end or rear-end collisions. In recent years, the use of side impact beams, also known as intrusion beams, has become more common. However, these beams, in at least some instances, have made more complicated and costly the process of manufacturing vehicle door assemblies. In such cases, the intrusion beam extends across the opening of an inner door panel that is used to mount components within a cavity between the inner door panel and an outer door panel and to mount the carrier to the inner door panel, and thus can interfere with the mounting of the components and carrier. In addition to complicating assembly, known intrusion beams are typically provided as stampings of solid steel beams configured as separate components for fixation to the door panel, and thus, they tend to be bulky, heavy, and costly from a material content standpoint. As such, aside from complicating assembly, known intrusion beams negatively affect fuel efficiency via added weight, which is also receiving ever-increasing attention, such as through fuel economy regulation laws.

In view of the above, there is a need to provide an intrusion beam that can be readily attached to an inner door panel of a door assembly without difficulty and without compromising the ability of the door assembly to provide enhanced side impact resistance and to enhance economies of manufacture and assembly, while also reducing weight to enhance fuel economy of the vehicle.

SUMMARY

This section provides a general summary of the disclosure and is not intended to be considered a complete and comprehensive listing of the disclosure's full scope or all of its aspects, advantages, objectives and/or features.

In accordance with one aspect, the present disclosure is directed to an intrusion member for a door assembly of a motor vehicle that provides enhanced side impact resistance and enhances economies of manufacture and assembly, while also reducing weight, thereby enhancing fuel economy of the vehicle.

In accordance with another aspect, the present disclosure is directed to a door assembly for a motor vehicle having an outer panel, an inner panel, and an intrusion member fixed to the inner panel, wherein the intrusion member provides enhanced side impact resistance and enhances economies of manufacture and assembly, while also reducing weight of the door assembly, thereby enhancing fuel economy of the vehicle.

In accordance with another aspect of the disclosure, the present disclosure is directed to a carrier module for a door assembly of a motor vehicle, with the carrier module having an integral reinforcement member that provides enhanced side impact resistance and enhances economies of manufacture and assembly, while also reducing weight, thereby enhancing fuel economy of the vehicle.

In accordance with another aspect of the disclosure, the present disclosure is directed to a carrier module for a door assembly of a motor vehicle, with the carrier module having an integral intrusion member that provides enhanced side impact resistance and enhances economies of manufacture and assembly, while also reducing weight, thereby enhancing fuel economy of the vehicle.

In accordance with another aspect of the disclosure, the present disclosure is directed to a door assembly for a motor vehicle having an outer panel, an inner panel, and a carrier module fixed to the inner panel and including an intrusion member integral to the carrier module that provides enhanced side impact resistance to the door assembly and enhances economies of manufacture and assembly, while also reducing weight of the door assembly, thereby enhancing fuel economy of the vehicle.

In accordance with another aspect of the disclosure, the present disclosure is directed to a carrier module for a door assembly of a motor vehicle, with the carrier module having an integral reinforcement member providing stiffness to the carrier module at desired locations throughout the carrier module.

In accordance with another aspect of the disclosure, a carrier module for a motor vehicle door assembly having inner and outer panels defining a door panel structure, with the inner panel having an opening for selective access to an internal door cavity between the inner and outer panels, is provided. The carrier module includes a carrier having an outer periphery configured for attachment to the inner panel to substantially close off the opening. The carrier module further includes at least one intrusion member integrally fixed thereto, said at least one intrusion member being formed of a material different from the carrier, with the at least one intrusion member having a resistance to loading, such as a resistance to bending and/or deformation, and has strength and/or stiffness greater than the material of the carrier.

In accordance with another aspect of the disclosure, the at least one intrusion member includes at least one elongate high-strength member fixed to the carrier.

In accordance with another aspect of the disclosure, the at least one elongate high-strength member can be overmolded with material of the carrier. Accordingly, the carrier and the at least one elongate high-strength member are integrally formed as a single, inseparable component.

In accordance with another aspect of the disclosure, the at least one elongate high-strength member can be formed of a metal.

In accordance with another aspect of the disclosure, the at least one elongate high-strength member can be formed of a lightweight, high-strength non-metal.

In accordance with another aspect of the disclosure, the at least one elongate high-strength member can include a plurality of elongate high-strength members extending in spaced relation from one another.

In accordance with another aspect of the disclosure, the at least one elongate high-strength member can be configured to extend across the carrier from one portion of the carrier outer periphery to another portion of the carrier outer periphery to span a corresponding dimension of the opening in the inner panel.

In accordance with another aspect of the disclosure, the at least one elongate high-strength member has opposite ends, wherein at least one of the opposite ends can be configured to extend beyond an outer periphery of the carrier for fixation to the inner panel.

In accordance with another aspect of the disclosure, the at least one elongate high-strength member can be provided having opposite flattened end regions with through openings configured for receipt of fasteners therethrough to facilitate fixing the carrier module to the inner panel.

In accordance with another aspect of the disclosure, the at least one elongate high-strength member can be configured to extend along a nonlinear path to facilitate routing the at least one high-strength member about features of the door assembly.

In accordance with another aspect of the disclosure, the at least one elongate high-strength member can include a plurality of nonlinear elongate high-strength members.

In accordance with another aspect of the disclosure, the plurality of elongate high-strength members can include at least three elongate high-strength members, with at least one of the elongate high-strength members being spaced in nonplanar relation with the other elongate high-strength members.

In accordance with another aspect of the disclosure, the at least one reinforcement member includes at least one elongate high-stiffness member fixed to the carrier.

In accordance with another aspect of the disclosure, an intrusion member for a motor vehicle door assembly, having inner and outer panels defining a door panel structure, with the inner panel having an opening for selective access to an internal door cavity between the inner and outer panels, is provided. The intrusion member includes an elongate body configured to extend, across the opening in the inner panel, lengthwise between opposite ends. The intrusion member further includes at least one high-strength member integrally fixed to the elongate body. The at least one high-strength member being formed of a material different from the elongate body, with the at least one high-strength member having a resistance to bending and strength greater than the material of the elongate body.

In accordance with another aspect of the disclosure, the at least one high-strength member is over-molded with material of the elongate body, with the at least one high-strength member extending lengthwise along the elongate body.

In accordance with another aspect of the disclosure, the at least one high-strength member over-molded in the elongate body of the intrusion member can include a plurality of high-strength members extending in laterally spaced relation from one another.

In accordance with another aspect of the disclosure, the elongate body of the intrusion member can be provided having a nonplanar wall, as viewed in lateral cross-section, wherein the at least one high-strength member can include at least three high-strength members, with at least one of the high-strength members being spaced in nonplanar relation with the other high-strength members.

In accordance with another aspect of the disclosure, the elongate body of the intrusion member can be tubular, thereby being lightweight due the presence of a hollow inner cavity and strong due having a periphery continuous wall.

In accordance with another aspect of the disclosure, the at least one high-strength member of the intrusion member can be provided having opposite flattened end regions with through openings configured for receipt of fasteners therethrough to facilitate fixing the intrusion member to the inner panel.

In accordance with another aspect of the disclosure, the at least one high-strength member of the intrusion member can extend along a nonlinear path to enhance design options and facilitate accommodating other features of the door assembly.

In accordance with another aspect of the disclosure, the at least one high-strength member of the intrusion member can be formed of a metal.

In accordance with another aspect of the disclosure, the at least one high-strength member can be formed of a lightweight, high-strength non-metal.

In accordance with another aspect of the disclosure, a method of constructing a carrier module for a motor vehicle door panel structure for closing off an opening in an inner panel of the motor vehicle door panel structure is provided. The method includes molding a carrier having an outer periphery configured for attachment to the inner panel to substantially close off the opening in the inner panel. Further, fixing at least one intrusion member to the carrier, with the at least one intrusion member being formed at least in part of a material having a bending strength that is greater than a bending strength of the carrier. Accordingly, the carrier can be formed of a material having a relative thin, lightweight construction, while the at least one intrusion member can provide a greatly increased bending strength to the carrier module.

In accordance with another aspect of the disclosure, the method of constructing the carrier module can further include fixing the at least one intrusion member to the carrier by over-molding the at least on intrusion member with material of the carrier while molding the carrier. Accordingly, the manufacture process is made streamline and economical.

In accordance with another aspect of the disclosure, the method of constructing the carrier module can further include providing the at least one intrusion member as a metal rod, wherein the metal rod can be provided having any desired shape, cross-sectional thickness and of any desire type of metal, including steel or otherwise.

In accordance with another aspect of the disclosure, the method of constructing the carrier module can further include over-molding the intrusion member to include a tubular elongate body having one or more metal intrusion members extending along a length of the tubular elongate body.

In accordance with another aspect, there is provided a composite vehicle door assembly for a motor vehicle including a door structure having an outer periphery to substantially close off an opening, and at least one reinforcement member fixed to the door structure. The at least one reinforcement member is formed of a material having a resistance to loading that is greater than a resistance to loading of a material the door structure. In a related aspect, the at least one reinforcement member is configured for attachment to the body of the motor vehicle.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 3C is a view similar to FIG. 3B, except showing a mechanical interference fitting of a metal rod/wire with the carrier module; FIG. 3D is an enlarged view of the encircled area 3D of FIG. 3C;

FIG. 4 is a perspective view of a carrier module of the vehicle of FIG. 1 in accordance with another aspect of the disclosure;

FIG. 4A is an enlarged plan view of a portion of the carrier module of FIG. 4;

FIG. 4B is a perspective view of a metal rod/wire of the carrier module of FIG. 4;

FIG. 5B is a plan view illustrating a portion of a door assembly of the vehicle of FIG. 1 having an intrusion member and a carrier module in a non-overlapping configuration in accordance with another aspect of the disclosure;

FIG. 6 is a cross-sectional perspective view of an intrusion member in accordance with another aspect of the disclosure;

DETAILED DESCRIPTION OF EXAMPLE EMBODIMENTS

Figure 1:
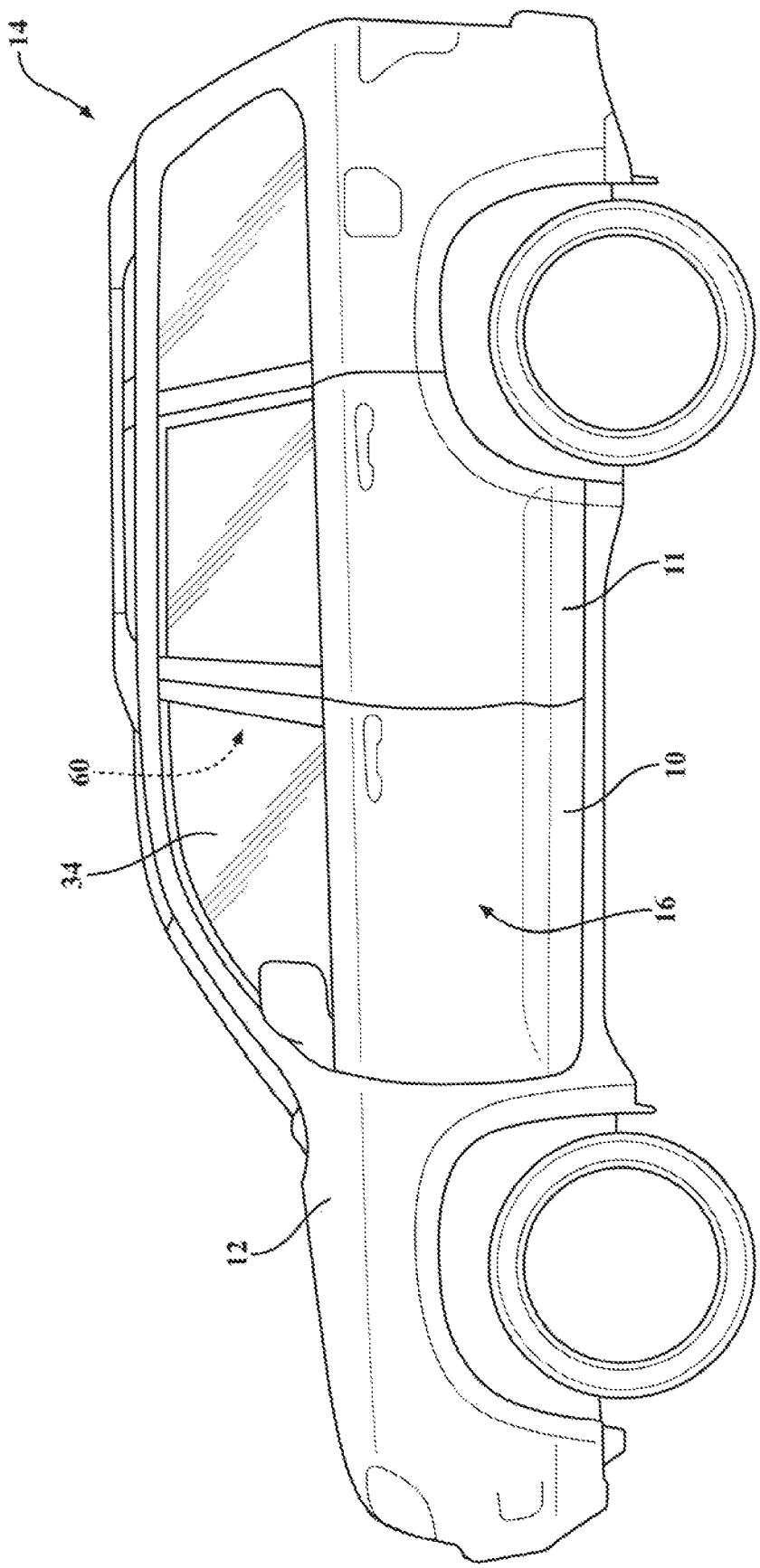
FIG. 1 illustrates a motor vehicle with a door assembly constructed in accordance with one aspect of the disclosure.

In general, example embodiments of a door assembly with carrier module and carrier module therefor, of the type configured including window regulators to be installed within an internal door cavity of a motor vehicle door assembly and having a barrier member configured to separate a wet side from a dry side of the door assembly, constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

An example one-piece carrier module embodiment disclosed in accordance with one aspect of the disclosure includes a barrier member and a carrier member configured to provide a pre-integrated intrusion member arrangement, with a pair of window regulators integrally attached to the carrier member, wherein the carrier allows the associated window regulators and components to be supported while providing improved intrusion protection.

Another example one-piece carrier module embodiment disclosed in accordance with one aspect of the disclosure includes a wall bounded by an outer periphery sized to close off an opening in an inner door panel, wherein the wall is provided having a variable wall thickness to provide relatively thickened regions having a first thickness providing enhanced support and mount surfaces and side impact resistance and relatively thinned regions having a second thickness, that is less than the first thickness, enhancing economies of manufacture and assembly, while also reducing weight, thereby enhancing fuel economy of the vehicle.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a door assembly 10 mounted to a body 12 of a motor vehicle 14. The door assembly 10 includes an outer panel 16, an inner panel 18 and a carrier assembly, referred to hereafter as carrier module 20, constructed in accordance with one presently preferred aspect of the disclosure. The construction, assembly, performance and structural impact resistance of the door assembly 10 is facilitated and enhanced directly as a result of the configuration of the carrier module 20, as discussed further hereafter and as will be readily appreciated by one skilled in the art. It will further be appreciated by the skilled artisan that the carrier module 20 can be incorporated into a rear passenger door assembly 11 or any other closure panel desired.

Figure 2A:
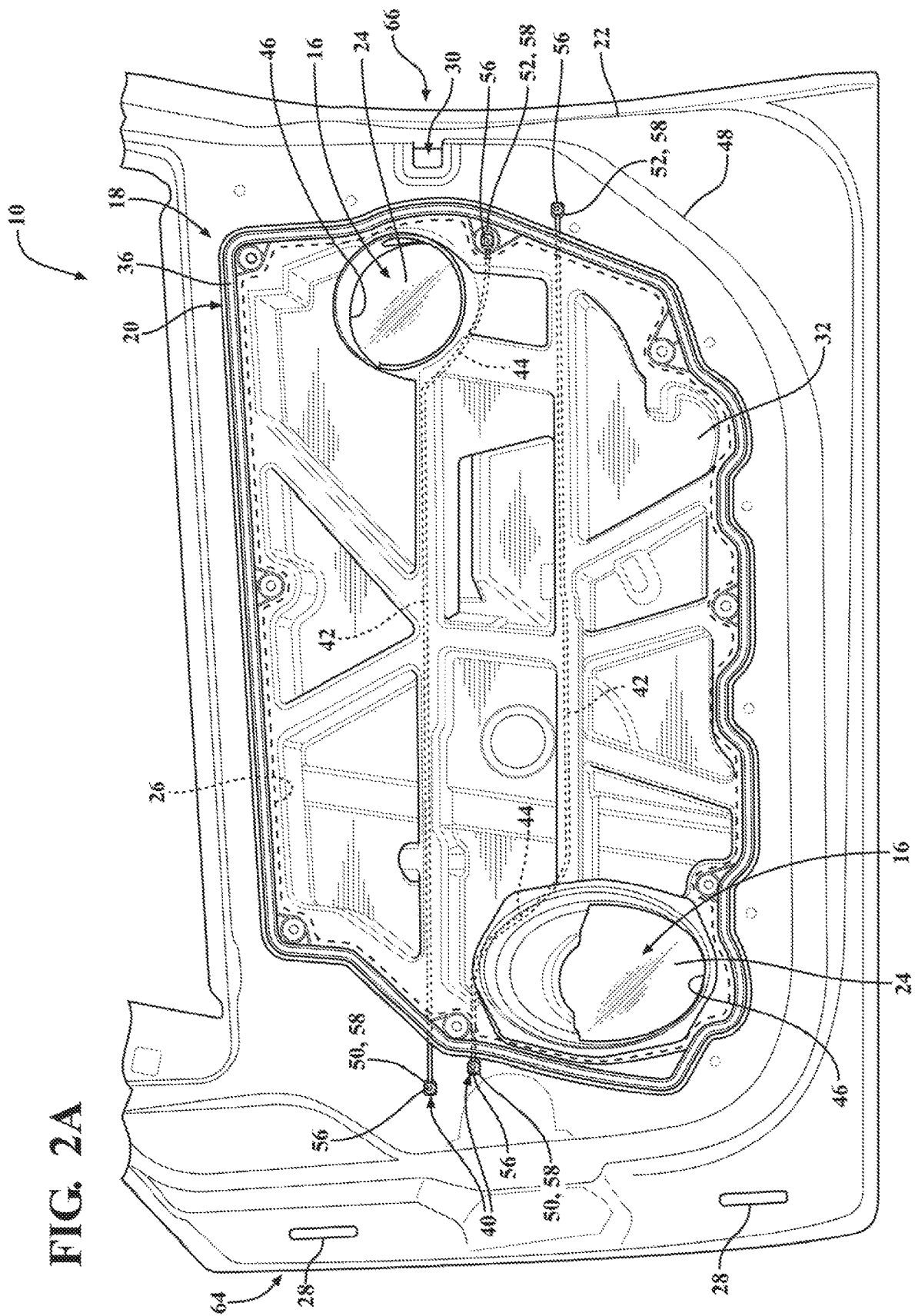
FIG. 2A is a schematic perspective view of a door assembly of the vehicle of FIG. 1 having a carrier module in accordance with another aspect of the disclosure.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 22 that forms an internal door cavity 24 that contains various components of the door assembly 10, including components of the carrier module 20. To facilitate assembly of the components into the cavity 24, the inner panel 18 has at least one opening 26 (FIG. 2A). The opening 26 is sized to allow access to the cavity 24 as necessary for assembly and service of components therein, as is known.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 28 are connected to door panel structure 22 and pivotally mount a front end of door panel structure 22 (and door assembly 10) to the vehicle body 12. A door latch 30 is mounted to the rear end of door panel structure 22 to permit the releasable closure of door assembly 10 against vehicle body 12, as is known. Hinges 28 and door latch 30 act as force transfer members through which forces in door assembly 10 are transmitted to vehicle body 12. Such forces include, for example, side-impact forces from another vehicle or object colliding with the vehicle 14.

The carrier module 20 is shown to include a barrier member, also referred to as carrier 32. Carrier 32 is shown as being configured for sealed mounting to inner panel 18 and to support a plurality of door hardware components, such as window and door latch components, including a power-operated window regulator having an electric motor-driven cable, pulleys, and lifter plates for moving a window 34 within glass run channels, by way of example and without limitation, as will be understood by one possessing ordinary skill in the vehicle door assembly art.

In accordance with a non-limiting embodiment, carrier 32 can be formed to function both as a fluid (water) barrier and as a sound barrier, and can be provided as a single-piece panel configured to receive a plurality of the aforementioned powered actuators and door hardware components in integrally formed contoured pockets. The carrier 32 can be adapted to be installed in fixed attachment to a surface of the inner panel 18 facing the passenger compartment of the vehicle 14 upon fixing the various components, such as those discussed above, in the internal door cavity 22. The carrier 32 can be formed of any suitable moldable material, including fluid/sound barrier material, as desired, in order to meet the desired specifications, such as a foam, plastic (e.g. thermoplastic glass-filled resin, such as glass-filled polypropylene, by way of example and without limitation) or like moldable materials. Further, in order to facilitate assembly, including ensuring the carrier 32 is properly located and fixed in sealed relation relative to the inner panel 18, the carrier 32 can be formed including a peripherally extending seal bead 36. The seal bead 36 can be provided as any suitable continuous bead of adhesive material capable of maintaining a fluid-tight seal between the carrier 32 and an outer surface of the inner panel 18, such as butyl, by way of example and without limitation. A selectively removable protective layer 38, sometimes referred to as release paper or release film, and referred to hereafter as release member 38, can be disposed over the seal bead 36 until it is desired to expose the seal bead 36 for bonding with the inner panel 18, thereby protecting the seal bead 36 against unwanted contamination.

Figure 3:
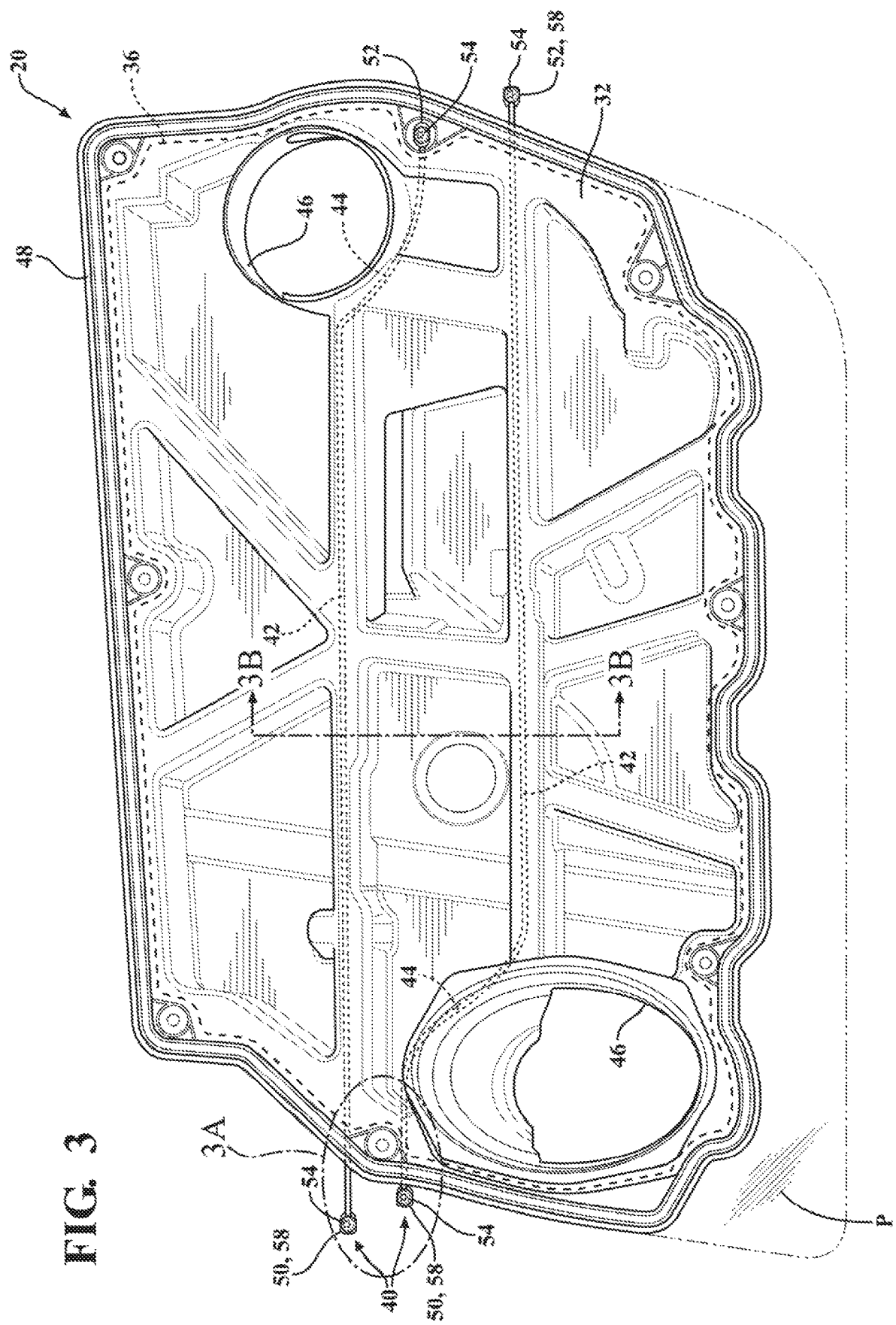
FIG. 3 illustrates a schematic plan view of a carrier module of the vehicle of FIG. 1 in accordance with another aspect of the disclosure.

Carrier 32 of carrier module 20, in accordance with one aspect of the disclosure, is molded to include at least one intrusion member 40, also referred to as a reinforcement member or impact reinforcement member, formed of a material different from the carrier 32, with the at least one intrusion member 40 having a resistance to loading, such as a resistance to bending or deformation for example as caused by a load applied to the carrier 32, and for example having a strength and/or stiffness greater than the material of the carrier 32. The at least one intrusion member 40 is shown as a plurality of high strength elongate members, such as elongate high strength metal wires/rods, referred to hereafter as elongate rods 40, by way of example and without limitation, though other materials are contemplated herein, including elongate high strength non-metal members, such as elongate high strength non-metal rods, and unidirectional tape, to provide the carrier module 20 with an enhanced impact resistance against impact forces directed transversely to a plane P (FIG. 3) along which carrier 32 generally extends, thereby enhancing the side impact resistance of carrier 32 and door assembly 10, thus, providing enhanced protection to occupants within motor vehicle 14 during side impacts, such as those experienced during an accident. Also, the at least one intrusion member 40 may be provided as, or in addition to, a high-stiffness member augmenting the stiffness of the carrier module 20 to withstand deformation, for example caused by road vibration, or sound vibrations generated by speakers mounted to the carrier module 20. The enhanced side impact resistance provided by carrier module 20 eliminates the need for separate side impact beams/members, including those commonly found extending within a cavity of a door assembly, thereby freeing up space within cavity 24, which ultimately makes assembly of components therein easier. Further yet, as will be appreciated by the skilled artisan, economies of manufacture and assembly are recognized by having the elongate rods 40 as a component of the carrier module 20, while also reducing weight of the door assembly 10, thereby enhancing fuel economy of the vehicle 14. The enhanced stiffness of the carrier module 20 may eliminate the development of resonance frequencies within the carrier module 20 and may improve the sound performance of mounted speakers to the carrier module 20.

Figure 3A:
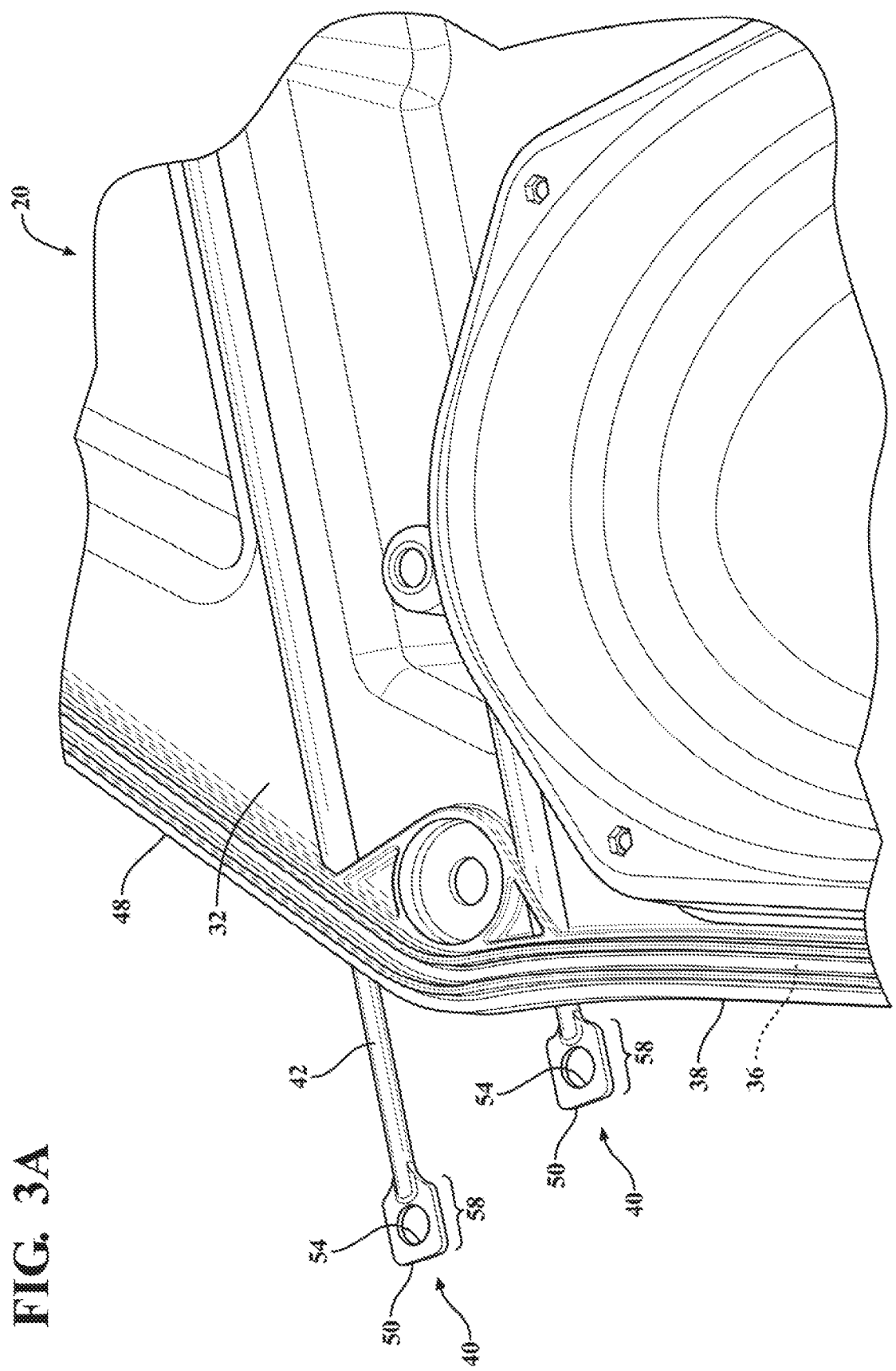
FIG. 3A is an enlarged perspective view of an encircled portion 3A of FIG. 3.
Figure 3B:
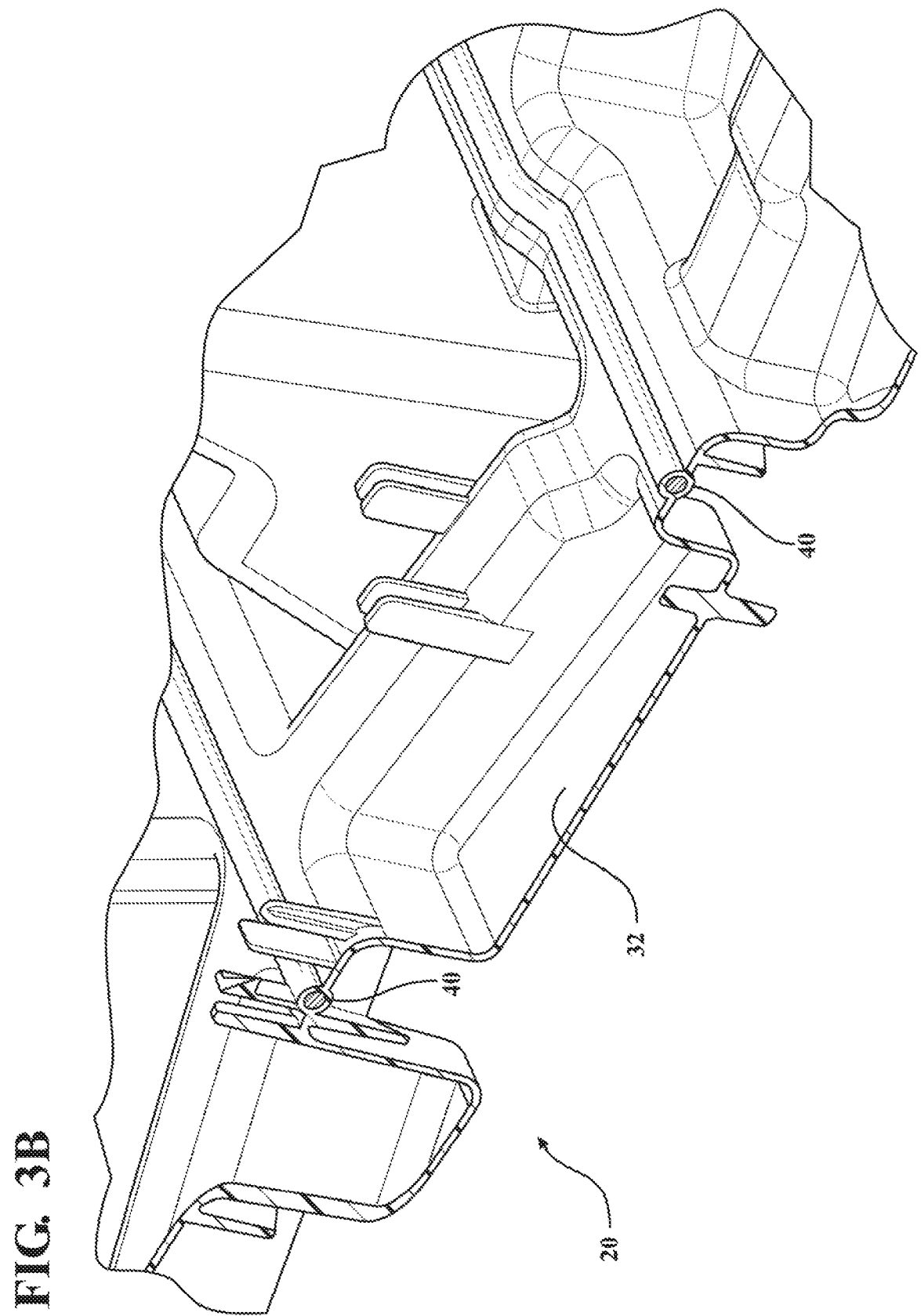
FIG. 3B is a cross-section perspective view taken generally along the line 3B-3B of FIG. 3.

The intrusion member(s) (elongate metal and/or non-metal rod(s)), referred to hereafter as rods 40, are over molded at least in part within the material of carrier 32, and are shown in FIGS. 3A and 3B as being entirely over molded cylindrical rods 40, such that the rods 40 are fully encapsulated by the material of carrier 32 along their length. Alternatively, as shown in FIGS. 3C and 3D, the rods 40 are mechanically connected and fixed with the carrier 32, for example by being inserted into mating receptacles 500 formed in the carrier 32. Retention features 505 may be provided to lock the rods 40 into mechanical connection with carrier 32, for example after the rods 40 have been snapped into fitted engagement with the receptacle 500. Adhesive may also be provided to enhance the fixed connection between the rods 40 and the carrier 32. The intrusion member(s), such as rod(s) 40, can be formed of any desired high bending/tensile strength metal, such as steel, titanium, Kevlar, or otherwise, and can be shaped to extend along any desire straight (linear) and/or non-straight, arcuate (nonlinear) path. It is to be recognized that the aforementioned bending and/or tensile strength of intrusion member(s) is provided to be greater than the bending and/or tensile strength of the material of the carrier 32, thereby increasing the bending and/or tensile strength properties of carrier 32. In an exemplary embodiment illustrated, a pair of rods 40 are shown as extending in spaced relation from one another, having generally linear sections 42 extending generally parallel with one another and, having nonlinear sections 44 extending about carrier features, such as openings 46 provided for receipt of speakers, by way of example and without limitation. Rods 40 provided in spaced relation may accommodate components required to be positioned between rods 40 which may otherwise be provided in an overlapping arrangement, and for example which may be mounted to the carrier 32, or other adjacent components such as an intrusion beam provided on one of the panels 16, 18, as shown in FIG. 5B for example. As a result the cross-sectional dimension e.g. width of the door assembly may be reduced. The rods 40 are shown as being configured to extend across a width (width direction extending from front end to rear end of motor vehicle 14) of the carrier 32 from one portion of an outer periphery 48 of carrier 32 to another portion of the outer periphery 48 to span a corresponding dimension of the opening 26 in the inner panel 18. As such, it is to be recognized that rod(s) 40 can extend across the entirety of the opening 26, if desired.

The rod(s) 40 extends lengthwise between opposite ends 50, 52, wherein at least one or both of the opposite ends 50, 52 can be configured to extend beyond the outer periphery 48 for anchored support against the inner panel 18. To facilitate anchoring the carrier assembly 20 and the rod(s) 40 to the inner panel 18, the opposite ends 50, 52 can be provided having through openings 54 configured for receipt of fasteners 56 therethrough to facilitate fixing the carrier module 20 to the inner panel 18. In the exemplary embodiment illustrated, the through openings 54 are shown extending through flattened end regions 58 of the rods 40. With the opposite ends 50, 52 of rod(s) 40 being fixed directly to inner panel 18, greatly enhanced tensile strength is provided to carrier assembly 20 across its width to enhance side impact resistance of door assembly 10, thereby minimizing the degree of intrusion of objects and inner panel 18 into an interior cabin 60 (FIG. 1) of motor vehicle 14 during a side impact crash condition.

In FIG. 4, a carrier module 120 constructed in accordance with another aspect of the disclosure is shown, wherein the same references numerals as used above, offset by a factor of 100, are used to identify like features.

Figure 2B:
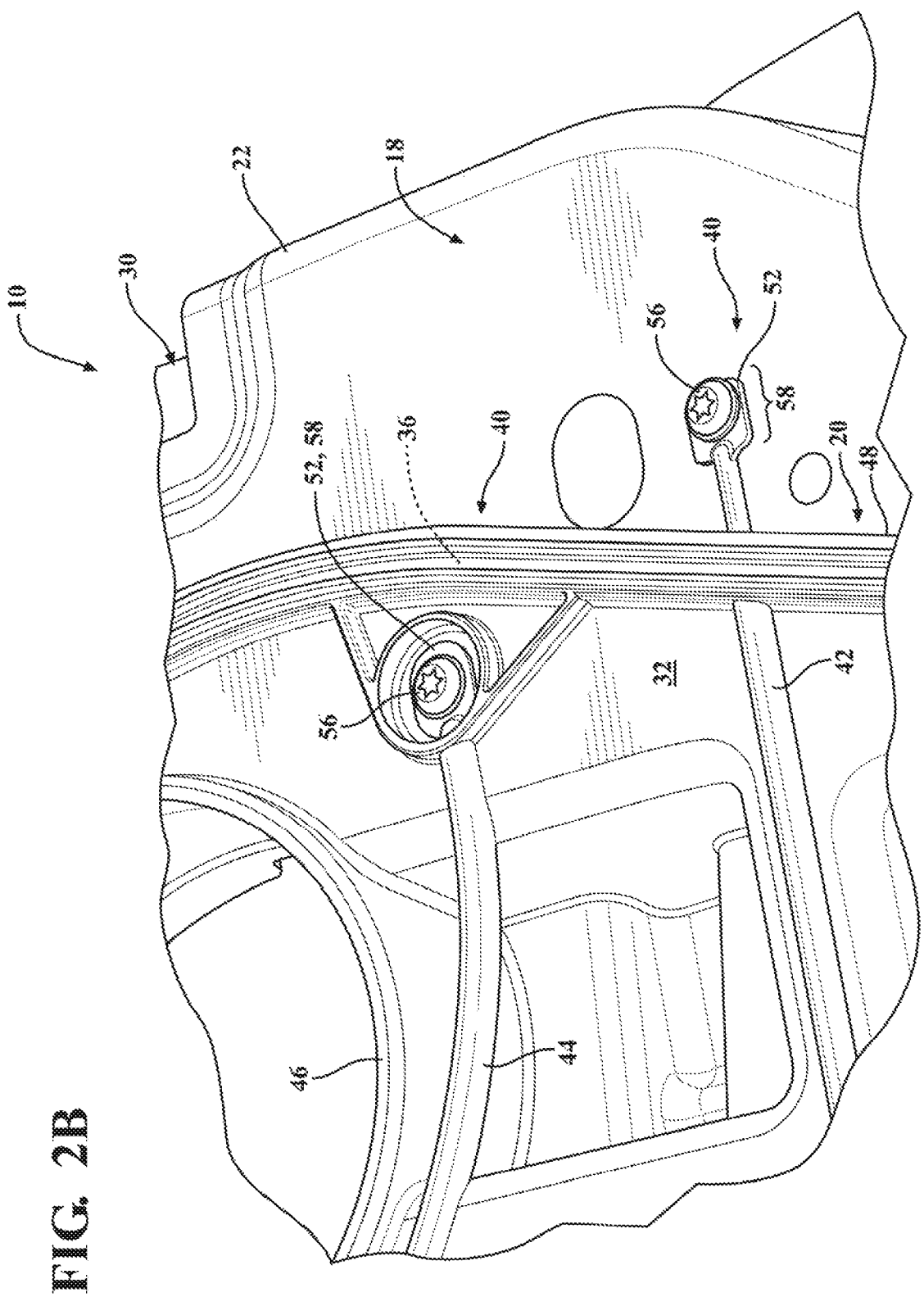
FIG. 2B is an enlarged perspective view of a portion of the door assembly of FIG. 2A.

Carrier module 120 has a molded carrier 132 and an integral intrusion member, also referred to as impact resistance member, including at least one metal wire/rod 140, by way of example and without limitation, over molded therein. A notable difference of carrier module 120 is the incorporation of laterally extending arm regions 62, 62' of carrier 132. Arm regions 62, 62' extend laterally outwardly from an outer periphery 148 of carrier 132, though it is to be recognized that arm regions 62, 62' are molded as a monolithic piece of the same material with carrier 132. Arm region 62 is configured to extend to a hinge region, shown as an upper hinge region 64 (FIG. 2), by way of example and without limitation, and arm region 62' is configured to extend to a latch region 66, by way of example and without limitation. As such, the arm region 62 configured for attachment to upper hinge region 64 is reinforced via the bolstered hinge region 64, while the arm region 62' configured for attachment to latch region 66 is reinforced via the bolstered latch region 66. As shown, arm region 62 has fastener through openings 154 configured to received fasteners, such as those used to fix a door hinge to body 12, by way of example and without limitation, while arm region 62' has a slot 68 configured to register with a striker slot in door panel structure 22.

Carrier module 120 further includes at least one, and shown best in FIG. 4A as a plurality of elongate metal wires/rods 140, by way of example and without limitation, to provide the carrier module 120 with an enhanced impact resistance, as discussed above for carrier module 20. The rods 140, as discussed above, are over molded with the material of the carrier 132, and thus, are at least partially or entirely encapsulated with the material of the carrier 132. The rods 140 extend laterally through a main body of carrier 132 and through laterally extending arm regions 62, 62' to ends 150, 152 having flattened end regions 158 and through openings 154 for receipt of fasteners, as discussed above for rods 40. The ends 150, 152 are encapsulated in arm regions 62, 62', though it is contemplated that they could extend outwardly therefrom, if desired. The rods 140 can be pre-shaped as desired to follow the desired path through the carrier 132 can arm regions 62, 62', such as shown in FIG. 4B, by way of example and without limitation. As such, the pre-shaped rod(s) 140 can be placed in a mold cavity in the desired orientation and location(s), whereupon the carrier 132 and arm regions 62, 62' thereof, if provided, can be formed via over molding the desired material about the rod(s) 140. It is to be recognized the rod(s) 140 can be provided of any desired diameter(s), quantity and configuration(s) as desired to obtain the desire impact resistance of the carrier module 120.

Figure 5:
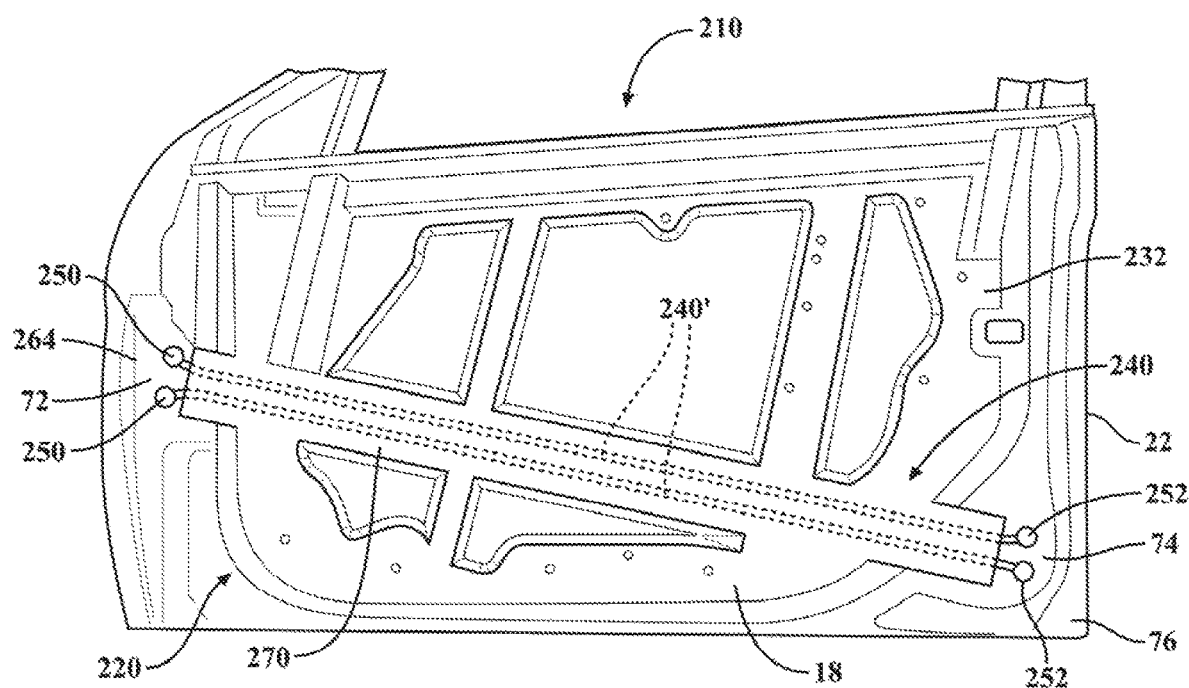
FIG. 5 is a plan view illustrating a portion of a door assembly of the vehicle of FIG. 1 having an intrusion member in accordance with another aspect of the disclosure.
Figure 5A:
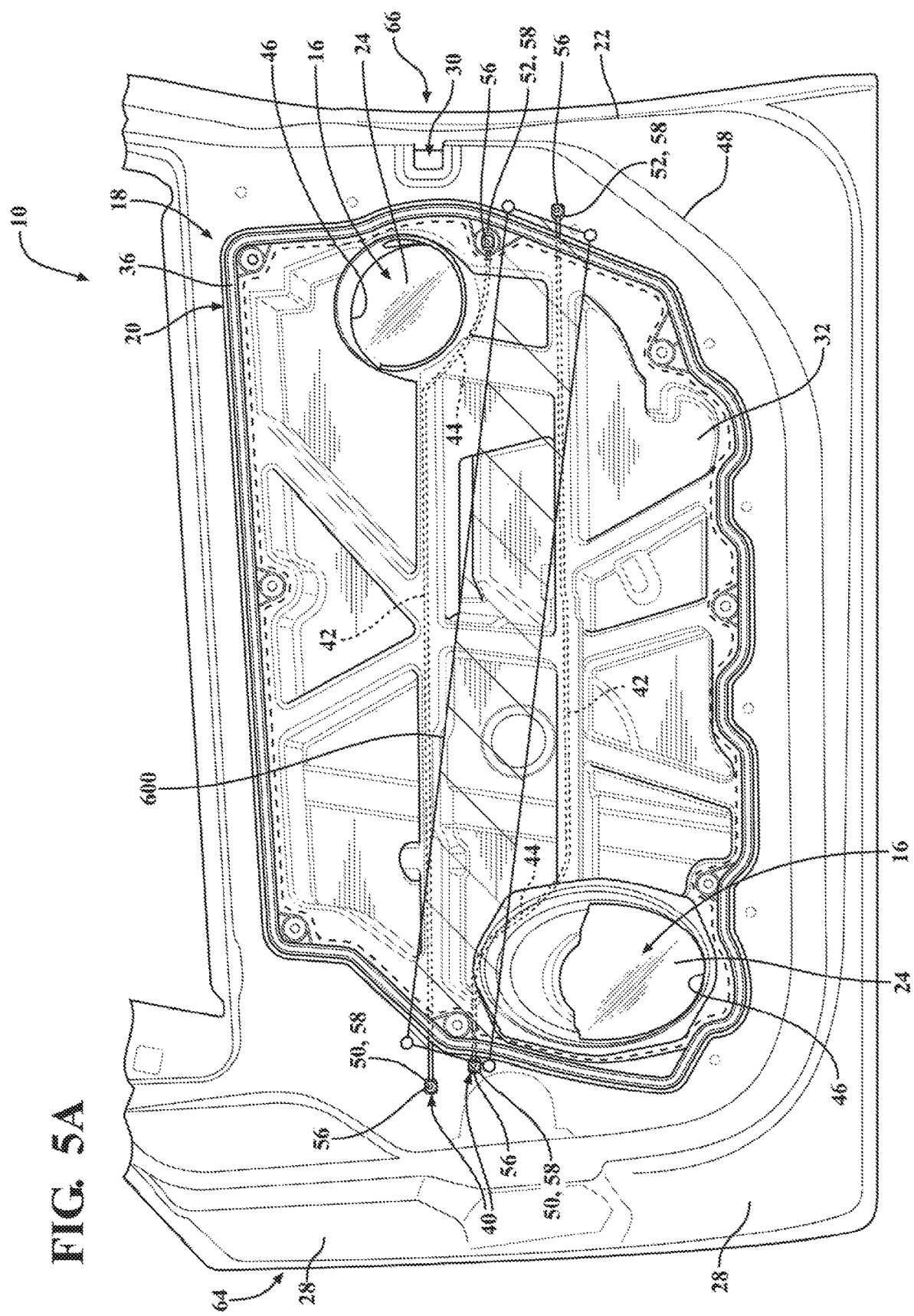
FIG. 5A is a plan view illustrating a portion of a door assembly of the vehicle of FIG. 1 having an intrusion member and a carrier module in an overlapping configuration in accordance with another aspect of the disclosure.

In FIG. 5, a composite intrusion member 240 of a carrier 232 of a carrier module 220 constructed in accordance with another aspect of the disclosure is shown, wherein the same references numerals as used above, offset by a factor of 200, are used to identify like features. In an embodiment, the composite intrusion member 240 may be provided along with the carrier module 220 having the integrated rods 40 for forming the door assembly 10. Alternatively, as shown in FIG. 5A, a door assembly 10 may be provided with known steel intrusion member 600 extending across the cavity 24 and further provided with the carrier module 20 having the integrated rods 40 to enhance the intrusion crash protection of the door assembly 10. The rods 40 may be aligned in an overlapping arrangement with the intrusion member 600, or, as shown in FIG. 5B, the rods 40 in a carrier 332 of a carrier module 320 may be aligned in a non-overlapping arrangement with the intrusion member 600.

Intrusion member 240 is configured for fixation to an inner panel 18 of a door panel structure 22 to enhance the side impact resistance thereof. Intrusion member 240 is formed having an elongate body 270 configured to extend laterally across inner panel 18, with elongate body 270 being molded of any desired material, such as discussed above for carrier 32. Intrusion member 240 further includes at least one, and shown as a plurality of wires/rods 240', by way of example and without limitation, over molded with material of body 270, wherein rods 240' extend in laterally spaced relation with one another in generally parallel relation between opposite ends 250, 252 located immediately adjacent opposite ends 72, 74 of body 270. One end 72 of intrusion member 240 is configured for fixation to one end of door panel structure 22, such as to a hinge region 264, and the other end 74 of intrusion member 240 is configured for fixation to an opposite end of door panel structure 22, such as to a lower corner region 76, by way of example and without limitation. As such, intrusion member 240 is kept free of obstruction with components of door assembly 210, such as window lifter plates and other window components. As discussed above, it is contemplated that body 270 and rod(s) 242' over molded therein can be readily shaped to follow any desired contour/path, thereby providing great design flexibility to door assembly 210, as will be appreciated by the skilled artisan upon viewing the disclosure herein.

In FIG. 6, a composite intrusion member assembly, also referred to as intrusion member 340, constructed in accordance with another aspect of the disclosure is shown, wherein the same references numerals as used above, offset by a factor of 300, are used to identify like features.

Composite intrusion member 340 can be configured for fixation to an inner panel of a door panel structure to enhance the side impact resistance thereof as discussed above for composite intrusion member 240, and further, as will be understood by one possessing ordinary skill in the art, upon viewing the disclosure herein, can be incorporated a monolithic piece of material into a carrier as discussed above for carrier modules 20, 120, 220. Intrusion member 340 is formed having an elongate body 370 molded of any desired material, such as discussed above for carrier 32. Intrusion member 340 further includes at least one, and shown as a plurality, and more particularly, at least three wires/rods 340', by way of example and without limitation, fixed to the elongate body 370, such as by being over molded with material of elongate body 370. At least two three wires/rods 340' may be provided each in a different plane of the carrier 32. The elongate body 370 is shown as being a hollow, tubular member, with rods 340' extending in laterally spaced relation with one another in generally parallel relation with one another. It is to be recognized that the geometric cross-sectional shape of the tubular elongate body 370 can take on any shape, whether continuous or varying along its length, with cross-sectional shape shown as being generally rectangular, including square, by way of example and without limitation. It is to be further recognized that the rods 340' can be located along any region of the tubular elongate body 370, with the rods 340' being shown on generally diametrically opposite sides of the elongate tubular body 370 from one another, by way of example and without limitation, located in corners of the generally rectangular elongate body 370. Accordingly, at least one of the rods 340' is shown as being spaced in nonplanar relation with the other rods 340', wherein the rods 340' are shown as extending along rectilinear corners of the hollow elongate body 370. As discussed above, it is contemplated that elongate body 370 and rod(s) 342' over molded therein can be readily shaped to follow any desired contour/path, thereby providing great design flexibility, as will be appreciated by the skilled artisan upon viewing the disclosure herein.

Figure 7:
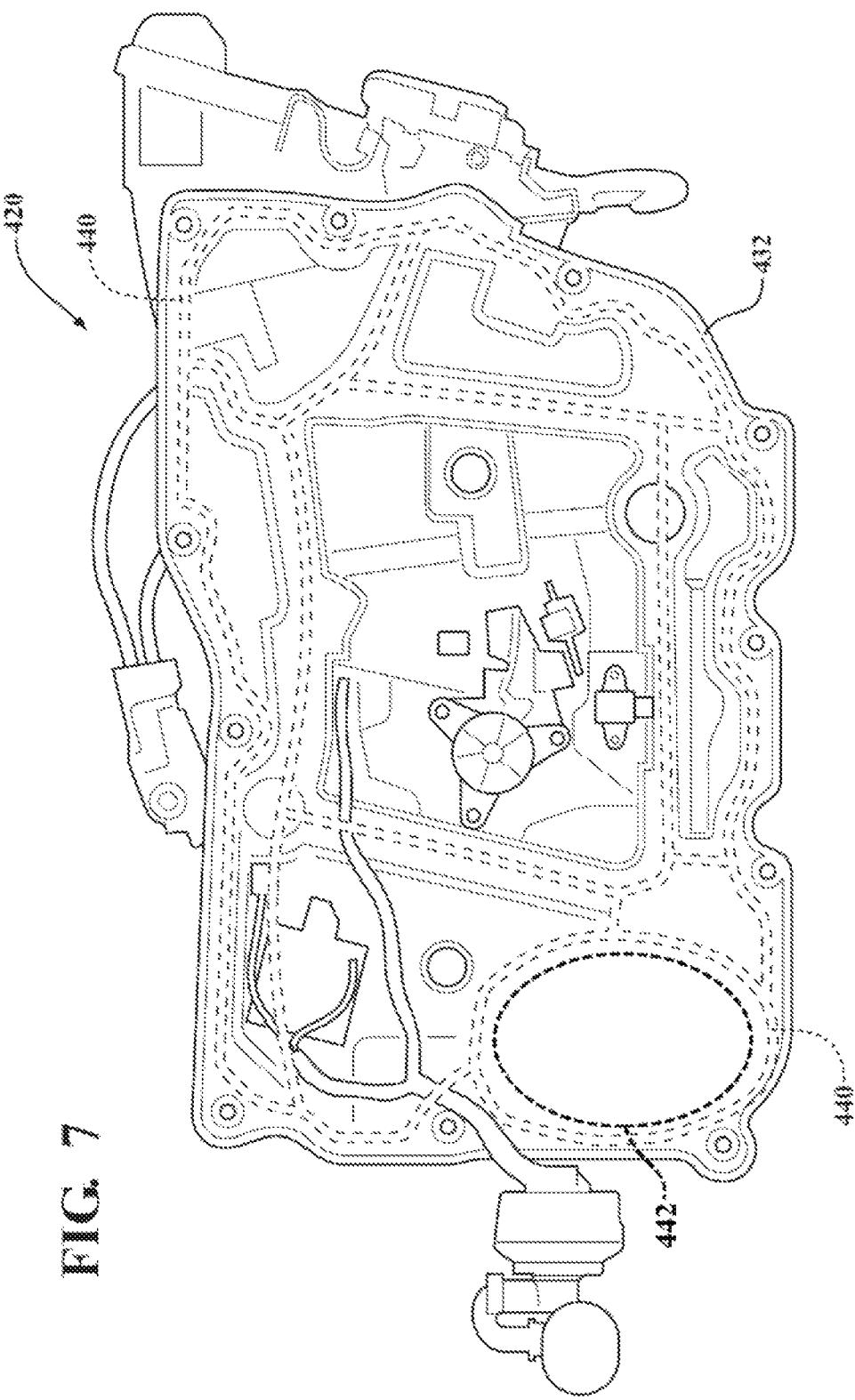
FIG. 7 is a schematic plan view of a door assembly of the vehicle of FIG. 1 having a carrier member in accordance with another aspect of the disclosure.

In FIG. 7, a carrier module 420 constructed in accordance with another aspect of the disclosure is shown, wherein the same references numerals as used above, offset by a factor of 400, are used to identify like features.

Carrier module 420 has a molded carrier 432 and an integral intrusion member, also referred to as impact resistance member, such as a metal wire/rod 440 over molded therein, by way of example and without limitation, similarly as discussed above for carrier module 20. Carrier module 420 illustrates a structural "web" or network of rod(s) 440 that can be used to enhance impact resistance of carrier module 420. Additionally, or alternatively, rods 440 may provide stiffness to carrier module 420 for example to dampen vibrations of the carrier module 420 caused by a speaker 442 mounted to carrier module 420. Illustratively, rods 440 may be provided to surround speaker 442, or may be provided at other locations and configurations, for example at locations of the carrier module 420 experiencing a resonance vibration, such as a center portion of the carrier module 420. Extending from the web of rods 440, optionally there may be provided rod extensions including openings 454 configured for receipt of fasteners 456 there through to facilitate fixing the carrier module 420 to the inner panel 18. Providing such distributed fastening points of the carrier module 420 allows loads to be more evenly distributed from the carrier module 420 to the inner panel 18, while providing a simultaneous assembly connection of the carrier module 420 to the inner panel 18 at the same moment as the reinforcing web of rods 440. It is shown to illustrate the ability to over mold rod(s) 440 in any desired pattern to attain the degree of side impact resistance desired, while bearing in mind the desire to keep weight to a minimum. Given the rod(s) 440 have reduced weight relative to steel plates, due to their having a reduced cross-section area and overall volume of material, various web patterns can be established to provide the side impact resistance desired, while at the same time, adding a minimal amount of weight to the carrier module 420. Providing a web of rods 440 may also add strength and rigidity to the carrier module 420, while providing support, such as through mounting points, directly to the rods 440 of various hardware components which are subject to higher loading forces, such as the window regulator, the window guide rails, and other components. It is to be recognized that the web pattern illustrated can be incorporated into the intrusion members 240, 340 discussed above, thereby lending to highly customizable shapes/contours, as needed for the intended vehicle platform.

Figure 8:
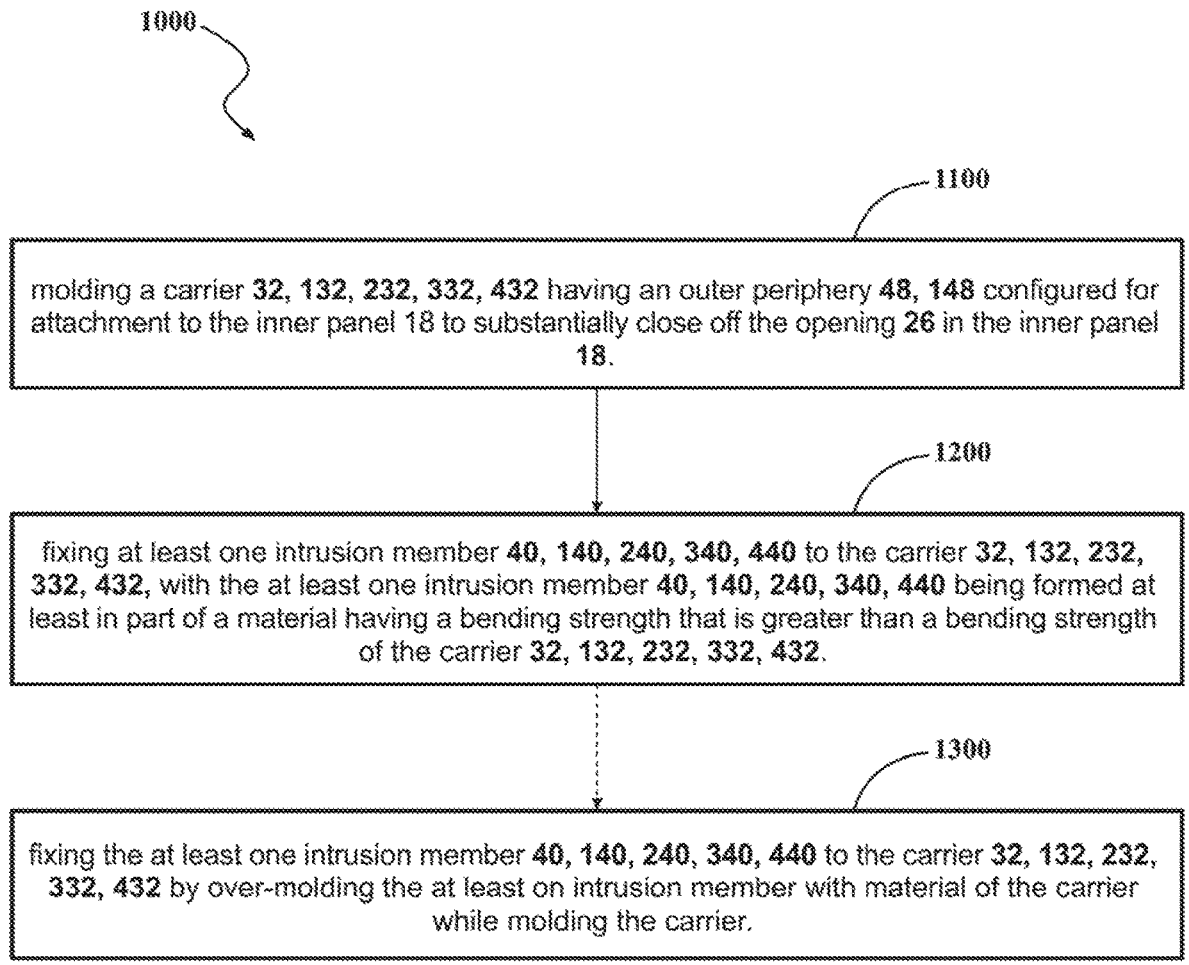
FIG. 8 is a flow diagram illustrating a method of constructing a carrier module in accordance with another aspect of the disclosure.

In accordance with another aspect of the disclosure, as shown in FIG. 8, a method 1000 of constructing a carrier module 20, 120, 220, 320, 420 for a motor vehicle door panel structure 22 for closing off an opening 26 in an inner panel 18 of the motor vehicle door panel structure 22 is provided. The method 1000 includes a step 1100 of molding a carrier 32, 132, 232, 332, 432 having an outer periphery 48, 148 configured for attachment to the inner panel 18 to substantially close off the opening 26 in the inner panel 18. Further, a step 1200 of fixing at least one intrusion member 40, 140, 240, 340, 440 to the carrier 32, 132, 232, 332, 432, with the at least one intrusion member 40, 140, 240, 340, 440 being formed at least in part of a material having a bending strength that is greater than a bending strength of the carrier 32, 132, 232, 332, 432. Accordingly, the carrier can be formed of a material having a relative thin, lightweight construction, while the at least one intrusion member can also be relative lightweight, while also providing a greatly increased bending strength to the carrier module 20, 120, 220, 320, 420.

In accordance with another aspect of the disclosure, the method of constructing the carrier module 20, 120, 220, 320, 420 can further include a step 1300 of fixing the at least one intrusion member 40, 140, 240, 340, 440 to the carrier 32, 132, 232, 332, 432 by over-molding the at least on intrusion member with material of the carrier while molding the carrier. Accordingly, the manufacture process is made streamline and economical, while the carrier module is made as a single component to reduce the complexity and cost of subsequent assembly to the vehicle door panel structure 22.

In accordance with another aspect of the disclosure, the method of constructing the carrier module 20, 120, 220, 320, 420 can further include a step of providing the at least one intrusion member 40, 140, 240, 340, 440 as a metal rod, wherein the metal rod can be provided having any desired shape, cross-sectional thickness and of any desire type of metal, including steel or otherwise.

In accordance with another aspect of the disclosure, the method of constructing the carrier module 320 can further include over-molding the intrusion member 340 to include a tubular elongate body 370 having one or more metal intrusion members 340' extending along a length of the tubular elongate body 370.

Figure 9:
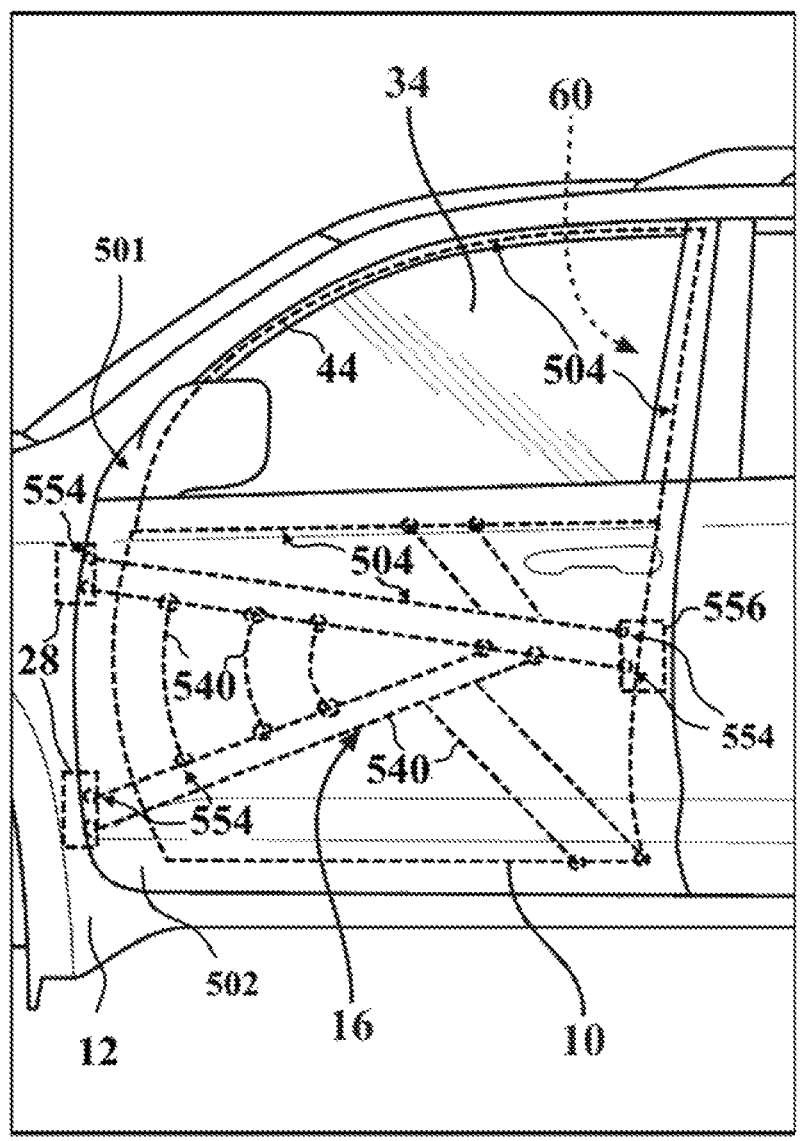
FIG. 9 illustrates a partial side view of a motor vehicle with a composite vehicle door assembly constructed in accordance with aspects of the present disclosure.

Now referring to FIG. 9, there is provided a composite door 501 constructed according to the teachings herein. Composite door 501 has a door structure 502, formed illustratively from a polymer material, such as a plastic, other material such as a fibrous material, or the like, and an integral reinforcement member or members 504, such as a metal wire/rod 540 over molded therein or connected therewith to door structure 502, by way of example and without limitation, similarly as discussed above for carrier module 20. Door structure 502 is shaped to close the opening provided in the vehicle body 12. Composite door 501 illustrates a network of rod(s) 540 that can be used to provide at least one of strength, support, stiffness, and impact resistance of composite door 501. Extending from the network of rods 540, optionally there may be provided rod extensions including openings 554 configured for receipt of fasteners there through to facilitate fixing the composite door 501 to the vehicle body 12 and for example for fixing the vehicle door 501 to a pair of hinges 28 and/or to other rods forming the network of rods 540 and/or for fixing hardware components, such as a door latch 556, door handles, window regulators, and the like to the network of rods 540. FIG. 9 is provided to illustrate the ability to over mold rod(s) 540 in any desired pattern to attain a lightweight and reinforced closure panel structure, while bearing in mind the desire to keep weight to a minimum. While a side door is illustrated, the constructions described herein may be applied for forming other types of closure panels, such as a lift gate, a bonnet, a deck lid, a trunk lid, as examples. Given the rod(s) 540 have reduced weight relative to steel plates, due to their having a reduced cross-section area and overall volume of material, various networked patterns can be established to provide the desired structural support, strength and/or stiffness, while at the same time, adding a minimal amount of weight to the composite door 501. Providing a network of rods 540 may also provide support, such as through mounting points, directly to the rods 540 of various hardware components which are subject to higher loading forces, such as the window regulator, the window guide rails, and other components. It is to be recognized that the network pattern of rods can be bent and shaped, for example in a non-linear manner so as to provide the desired shape for closing the opening, and/or for routing rods to areas of the composite door 500 where strength and/or stiffness is required, or for routing of the rods 540 around components to reduce the cross-sectional area of the composite door 501.

While the above description constitutes a plurality of embodiments of the present invention, it will be appreciated that the present invention is subject to further modification and change without departing from the fair interpretation and intended meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carrier module for a motor vehicle door assembly having inner and outer panels defining a door panel structure with the inner panel having an opening for selective access to an internal door cavity between the inner and outer panels, said carrier module, comprising:

a carrier having an outer periphery configured for attachment to said inner panel to substantially close off said opening and being configured to support a plurality of door hardware components; and at least one reinforcement member fixed to said carrier, said at least one reinforcement member being formed of a material having a resistance to loading that is greater than a resistance to loading of a material of said carrier.

2. The carrier module of claim 1, wherein said at least one reinforcement member is over-molded with material of said carrier.

3. The carrier module of claim 1, wherein said at least one reinforcement member is a metal rod.

4. The carrier module of claim 3, wherein said at least one metal rod includes a plurality of metal rods extending in spaced relation from one another.

5. The carrier module of claim 3, wherein said at least one metal rod has opposite flattened end regions with through openings configured for receipt of fasteners therethrough to facilitate fixing the carrier module to the inner panel.

6. The carrier module of claim 1, wherein said at least one reinforcement member is configured to extend across said carrier from one portion of said outer periphery to another portion of said outer periphery to span a corresponding dimension of the opening in the inner panel.

7. The carrier module of claim 1, wherein said at least one reinforcement member has opposite ends, with at least one of said opposite ends extending beyond the outer periphery.

8. The carrier module of claim 1, wherein said at least one reinforcement member extends along a nonlinear path.

9. The carrier module of claim 8, wherein said at least one reinforcement member includes a plurality of reinforcement members extending along nonlinear paths.

10. The carrier module of claim 1, wherein said at least one reinforcement member includes at least two reinforcement members, at least one of said reinforcement members being spaced in nonplanar relation with the other of said reinforcement members.

11. An intrusion member assembly for a motor vehicle door assembly having inner and outer panels defining a door panel structure with the inner panel having an opening for selective access to an internal door cavity between the inner and outer panels, said intrusion member, comprising:
    an elongate body configured to extend lengthwise between opposite ends across the opening in the inner panel; and
    at least one intrusion member fixed to said elongate body, said at least one intrusion member extending lengthwise along said elongate body and having a bending strength that is greater than a bending strength of said elongate body, wherein said at least one intrusion member includes a metal rod.

12. An intrusion member assembly for a motor vehicle door assembly having inner and outer panels defining a door panel structure with the inner panel having an opening for selective access to an internal door cavity between the inner and outer panels, said intrusion member, comprising:
    an elongate body configured to extend lengthwise between opposite ends across the opening in the inner panel; and
    at least one intrusion member fixed to said elongate body, said at least one intrusion member extending lengthwise along said elongate body and having a bending strength that is greater than a bending strength of said elongate body, wherein said at least one intrusion member is over-molded with material of said elongate body.

13. The intrusion member of claim 11, wherein said at least one intrusion member includes a plurality of metal rods extending in laterally spaced relation from one another.

14. The intrusion member of claim 11, wherein said elongate body has a nonplanar wall as viewed in lateral cross-section and wherein said at least one intrusion member includes at least three intrusion members, at least one of said intrusion members being spaced in nonplanar relation with the other of said intrusion members.

15. The intrusion member of claim 14, wherein said elongate body is tubular.

16. The intrusion member of claim 15, wherein said at least one intrusion member is over-molded with material of said nonplanar wall.

17. A method of constructing a carrier module for a motor vehicle door panel structure for closing off an opening in an inner panel of the motor vehicle door panel structure, comprising:
    molding a carrier configured to support a plurality of door hardware components and having an outer periphery configured for attachment to the inner panel to substantially close off said opening; and
    fixing at least one reinforcement member to the carrier, with the at least one reinforcement member being formed at least in part of a material having a resistance to loading that is greater than a resistance to loading of the carrier.

18. The method of claim 17, further including fixing at least one reinforcement member to the carrier by over-molding the at least on reinforcement member with material of the carrier while molding the carrier.

19. The method of claim 17, further including providing the at least one reinforcement member as a metal rod.

* * * * *